US011736580B1

(12) United States Patent
Bhuyan et al.

(10) Patent No.: US 11,736,580 B1
(45) Date of Patent: Aug. 22, 2023

(54) FIXING MICROSERVICES IN DISTRIBUTED TRANSACTIONS

(71) Applicant: INTUIT INC., Mountain View, CA (US)

(72) Inventors: Ranadeep Bhuyan, Karnataka (IN); Steven Michael Saxon, Rancho Mirage, CA (US); Aminish Sharma, Bangalore (IN)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/161,976

(22) Filed: Jan. 31, 2023

(51) Int. Cl.
*H04L 29/08* (2006.01)
*H04L 67/51* (2022.01)
*H04L 41/16* (2022.01)

(52) U.S. Cl.
CPC .............. *H04L 67/51* (2022.05); *H04L 41/16* (2013.01)

(58) Field of Classification Search
CPC .................................. H04L 67/51; H04L 41/16
See application file for complete search history.

(56) References Cited

U.S. PATENT DOCUMENTS 10,452,455 B1\* 10/2019 Walters .................... G06T 7/194
2020/0159591 A1\* 5/2020 Rudolph ............... H04L 67/562

\* cited by examiner

*Primary Examiner* — Adnan M Mirza
(74) *Attorney, Agent, or Firm* — Patterson + Sheridan, LLP (57) ABSTRACT

The present disclosure provides techniques for recommending vendors using machine learning models. One example method includes generating a dependency graph based on one or more microservices in a transaction, wherein each node of the dependency graph corresponds to each microservice of the one or more microservices in the transaction, respectively, generating a first set of features using the dependency graph, predicting a first set of nodes that are likely to fail using a first machine learning model based on the first set of features, generating a second set of features using the dependency graph, predicting a second set of nodes that are likely to fail using a second machine learning model based on the second set of features, and applying one or more fixes to one or more microservices based on a combination of the first set of nodes and the second set of nodes.

15 Claims, 5 Drawing Sheets

FIG. 5

FIXING MICROSERVICES IN DISTRIBUTED TRANSACTIONS

INTRODUCTION

Aspects of the present disclosure relate to fixing microservices in distributed transactions.

A distributed transaction is a type of transaction that involves multiple databases or other resources that are located on different computers or servers. In a distributed transaction, a single logical unit of work is executed across multiple databases or resources, and the results of the transaction are either committed or rolled back on all participating resources as a single unit.

Two popular microservice architectures for distributed transactions are the synchronous two-phase commit (2pc) pattern and the asynchronous staged aggregate computations (Saga) pattern. The two patterns help distributed transactions to achieve atomicity (either all steps in a transaction are complete or no step is complete).

Given the number of microservices involved in the implementation of a distributed transaction, the microservices are prone to errors and can fail. However, existing techniques often have to apply fixes to a microservice after the microservice fails, and the errors might spill over when fixes are applied. The existing approaches are tedious and inefficient for addressing failed microservices in a distributed transaction.

Accordingly, improved systems and methods are needed for fixing microservices in distributed transactions.

BRIEF SUMMARY

Certain embodiments provide a method for fixing microservices in distributed transactions. The method generally includes generating a dependency graph based on one or more microservices in a transaction, wherein each node of the dependency graph corresponds to each microservice of the one or more microservices in the transaction, respectively, generating a first set of features using the dependency graph, predicting a first set of nodes that are likely to fail using a first machine learning model based on the first set of features, generating a second set of features using the dependency graph, predicting a second set of nodes that are likely to fail using a second machine learning model based on the second set of features, and applying one or more fixes to one or more microservices based on a combination of the first set of nodes and the second set of nodes.

Another embodiment provides a system for fixing microservices in distributed transactions. The system generally includes a memory including computer-executable instructions and a processor configured to execute the computer-executable instructions. Executing the computer executable-instructions causes the system to generate a dependency graph based on one or more microservices in a transaction, wherein each node of the dependency graph corresponds to each microservice of the one or more microservices in the transaction, respectively, generate a first set of features using the dependency graph, predict a first set of nodes that are likely to fail using a first machine learning model based on the first set of features, generate a second set of features using the dependency graph, predict a second set of nodes that are likely to fail using a second machine learning model based on the second set of features, and apply one or more fixes to one or more microservices based on a combination of the first set of nodes and the second set of nodes.

Still another embodiment provides a non-transitory computer readable medium for fixing microservices in distributed transactions. The non-transitory computer readable medium generally includes instructions to be executed in a computer system, wherein the instructions when executed in the computer system perform a method for fixing microservices in distributed transactions on a computing device requiring minimal run time processing. The method generally includes generating a dependency graph based on one or more microservices in a transaction, wherein each node of the dependency graph corresponds to each microservice of the one or more microservices in the transaction, respectively, generating a first set of features using the dependency graph, predicting a first set of nodes that are likely to fail using a first machine learning model based on the first set of features, generating a second set of features using the dependency graph, predicting a second set of nodes that are likely to fail using a second machine learning model based on the second set of features, and applying one or more fixes to one or more microservices based on a combination of the first set of nodes and the second set of nodes.

The following description and the related drawings set forth in detail certain illustrative features of the various embodiments.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for fixing microservices in distributed transactions.

Currently, fixes (e.g., hotfixes, transactional lock activation, and so on) are applied to a microservice only after the microservice has failed. This requires tedious debugging by developers and often halts the distributed transaction, causing delay and inconvenience for the users. In some environments (e.g., based on Saga patterns) the failed microservice can even cause errors to spill over to other microservices in the distributed transaction.

Embodiments of the present disclosure address these deficiencies in distributed transactions and resulting limitations in fixing microservices in distributed transactions. Techniques described herein allow microservices to be fixed even before they fail in distributed transactions.

According to certain embodiments, a dependency graph is first generated for microservices of a distributed transaction. For example, the dependency graph can be a directed graph, where each node of the dependency graph represents a microservice in the distributed transaction or the computing device associated with the microservice, and each directed edge represents the data flow from an upstream microservice to a downstream microservice.

Machine learning based approaches can be used to predict whether a microservice in the transaction is likely to fail using the dependency graph, and fixes can be preemptively applied to a microservice with a predicted high risk of failure. In some embodiments, an ensemble model is used to predict whether microservices are likely to fail. The ensemble model can include several separate classifiers whose results can be aggregated to produce accurate predictions. Details regarding the ensemble model can be found below with respect to FIG. 2.

In some embodiments (e.g., with Saga patterns), the microservices in the distributed transaction are monitored by a coordinator. Microservices in the distributed transaction can listen to and publish to channels known as topics. The coordinator can monitor all topics (e.g., messages and events) in the distributed transaction. Additionally, when a microservice is predicted to fail, the coordinator can apply fixes to the microservice.

By calculating a likelihood to fail for each microservice in a distributed transaction, techniques described herein overcome deficiencies in existing techniques for fixing microservices in distributed transactions. For example, while existing techniques apply fixes to microservices in a distributed transaction only after the microservices fail, techniques described herein allow fixes to be applied preemptively to microservices before they fail, preventing possible spillover of errors. Furthermore, by utilize machine learning techniques in calculating the likelihoods to fail for microservices, techniques described herein help accurately identify microservices likely to fail. Embodiments of the present disclosure improve the functioning of involved software applications as well as improve a user experience by performing distributed transactions with greater efficiency and fewer errors. Furthermore, by pre-emptively preventing the failure of microservices and the propagation of errors in microservices, techniques described herein avoid the utilization of physical computing resources that would otherwise be needed to process and/or fix failures and/or erroneous data after such failures and/or errors occurred, thereby improving the functioning of involved computing devices.

EXAMPLE DISTRIBUTED TRANSACTIONS

Figure 1:
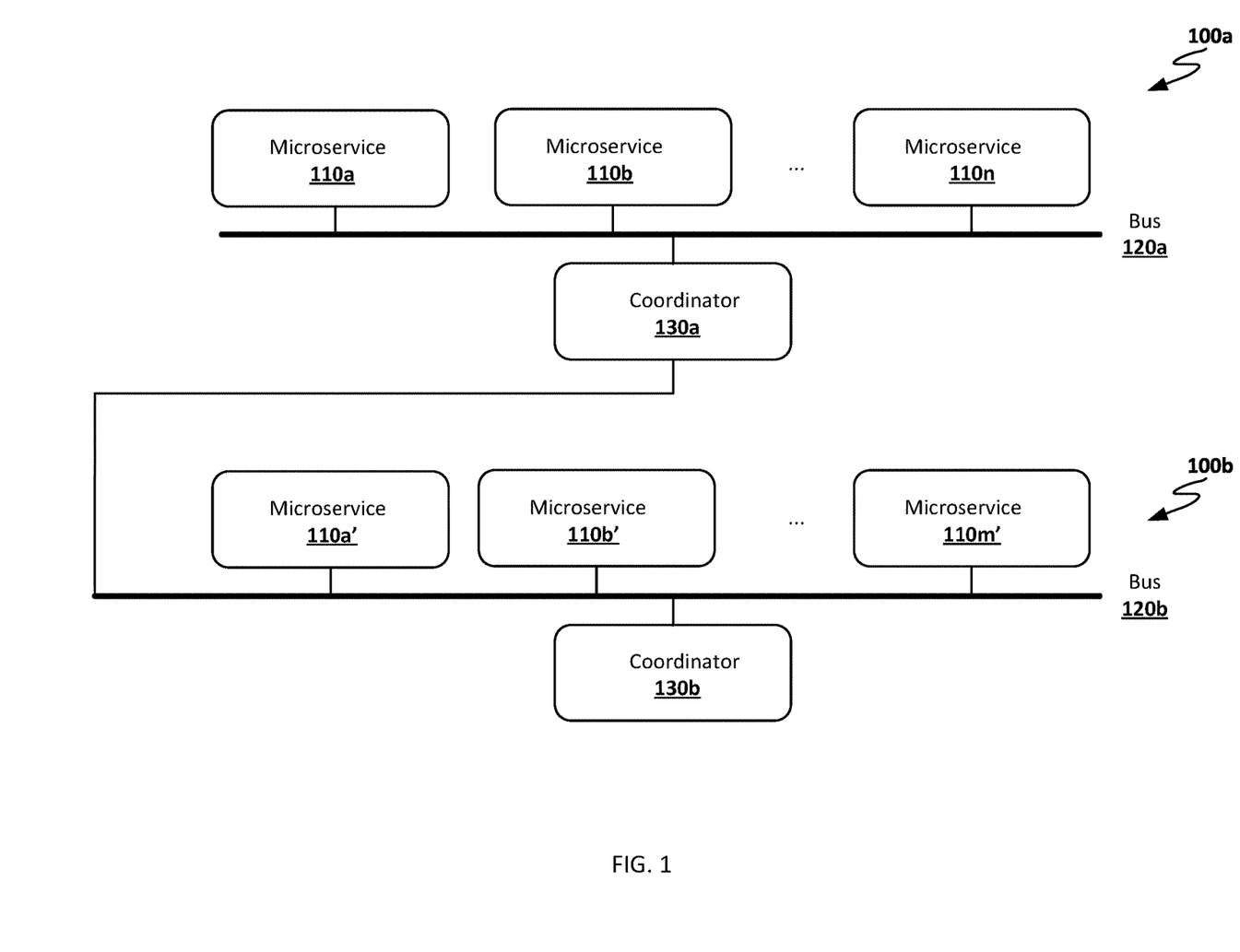
FIG. 1 depicts example distributed transactions.

FIG. 1 depicts example distributed transactions 100*a-b*. As depicted, transactions 100*a-b* are just two examples of distributed transactions in a distributed computing environment, and more or fewer transactions can be implemented in a distributed computing environment. Even though transactions 100*a-b* are depicted as having Saga patterns, other distributed computing patterns or architectures can be used. Although transactions 100*a-b* are depicted to include several stages, more or fewer stages can be included in transactions 100*a-b*. For simplicity, in this example, each microservice of transactions 100*a-b* represents one stage in the Saga pattern, though more microservices can be included in a stage.

Transaction 100*a* includes N stages, corresponding to microservices 110*a-n*, whereas Transaction 100*b* includes M stages, corresponding to microservices 110*a'* -*m'*. Each stage of transactions 100*a-b* can be executed independently, and the results of the stage are used to determine which subsequent stage should be executed next. For example, transactions 100*a-b* can include stages such as payload separation, order creation, payment processing, inventory update, order delivery, and so on, which are performed independently and in succession.

For simplicity, in this example, stages are executed in a consecutive order, such that the correct output of microservice 110*a* prompts executing microservice 110*b*, the correct output of microservice 110*a'* prompts executing microservice 110*b'*, and so on.

Microservices 110*a-n* and 110*a'*-*m'* can listen to and publish to channels known as topics. As illustrated, bus 120*a* aggregates all topics in transactions 100*a*, whereas bus 120*b* aggregates all topics in transactions 100*b*. A topic can be used to transmit messages or broadcast events. Accordingly, a message or an event triggers the execution of a subsequent microservice through the bus.

A coordinator (e.g., as a process manager and/or an orchestrator) can be used to monitor each distributed transaction, which is responsible for listening to messages events and triggering endpoints. As illustrated, coordinator 130*a* monitors transaction 100*a* through bus 120*a* whereas coordinator 130*b* monitors transaction 100*b* through bus 120*b*. Coordinators 130*a-b* can generate a dependency graph representing the data flow in the distributed transactions. For example, the dependency graph can be a directed graph, where each node of the dependency graph represents a microservice in the distributed transaction or the computing device associated with the microservice, and each outgoing edge represents the data flow from an upstream microservice to a downstream microservice.

In addition, coordinators 130*a-b* can include machine learning models to predict whether microservices 110*a-n* and 110*a'*-*m'* will fail, and in response, apply fixes (e.g., hotfixes, transactional lock activation, and so on) to one or more of microservices 110*a-n* and 110*a'*-*m'* predicted to fail. Details regarding predicting whether microservices will fail can be found below with respect to FIG. 2.

In this example, some of microservices 110*a'*-*m'* of transactions 100*b* form compensating transactions for some of microservices 110*a-n* of transaction 100*a*. A compensating transaction for a stage (e.g., a microservice) undoes (e.g. reverts) the effects of the stage in the original operation (e.g., transaction). The compensating transaction might not have to undo the work in the exact reverse order of the original operation, and it might be possible to perform some of the undo steps in parallel. The compensating transaction could also fail but is an eventually consistent operation. The compensating transaction can be resumed or retried at the point of failure and continue, so the steps (e.g., stages) in a compensating transaction should be defined as idempotent commands. A compensating transaction can be performed with one or more microservices.

A coordinator can incorporate information about the compensating transaction in the inputs to the machine learning models. In an example, a compensating transaction for microservice 110*b* includes microservice 110*b'*, which is monitored by coordinator 130*a* through bus 120*b*. Accordingly, coordinator 130*a* can incorporate information about the compensating transaction in the inputs to the machine learning models to compute the likelihood to fail for microservice 110*b* (e.g., generating the dependency graph including nodes representing microservices in the compensating transaction). Details regarding incorporating information from a compensating transaction can be found below with respect to FIG. 2.

EXAMPLE MACHINE LEARNING MODEL FOR FIXING MICROSERVICES IN DISTRIBUTED TRANSACTIONS

Figure 2:
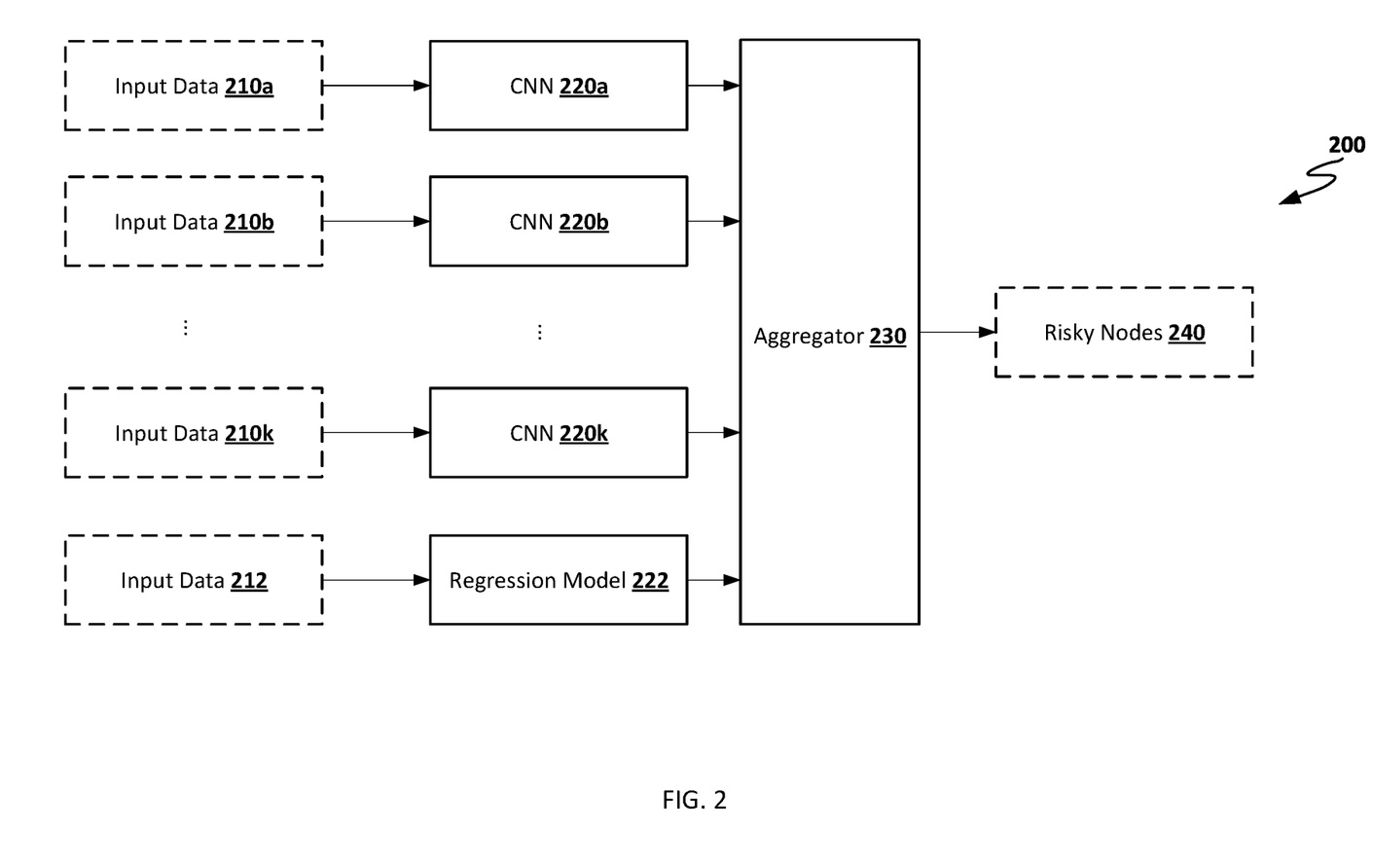
FIG. 2 depicts an example machine learning model for fixing microservices in distributed transactions.

FIG. 2 depicts an example machine learning model 200 for fixing microservices in distributed transactions. Machine learning model 200 can be used to compute a likelihood to fail for a microservice, such as microservices 110a-n and 110a'-m'as shown in FIG. 1. Machine learning model 200 can be included in and/or utilized by a coordinator of a distributed transaction, such as coordinator 120a-b as shown in FIG. 1. Although depicted as an ensemble model including several sub-models, machine learning model 200 can include fewer or more sub-models.

Machine learning model 200 can take input data 210a-k and input data 212 to identify risky nodes 240 representing a set of microservices with high likelihoods to fail. Input data 210a-k and input data 212 can be generated (e.g., aggregated) by coordinators such as coordinators 130a-b as shown in in FIG. 1.

Input data 210a-k can include, for example, information about, for each node of the dependency graph, a size of payload (e.g., request size) for the node, an action duration (e.g., a delta between when the request is received and when the corresponding microservice starts to execute) of the node, a status (e.g., running, waiting, terminating, and so on) of the node, a type of a call (e.g., HTTP, HTTPS, FTP, and so on) to the node, or a network address (e.g., IP address) of the node. Input data 210a-k can be represented using appropriate data structures, such as matrices, tensors, Pandas Dataframes, and so on.

Input data 212 can include, for example, information about a number of nodes in the dependency graph, a mean execution time of all nodes in the dependency graph, a standard deviation of execution time of all nodes in the dependency graph, and, for each node of the dependency graph, a number of nodes preceding the node in the dependency graph, a number of nodes succeeding the node in the dependency graph, a standard deviation of execution time (e.g., time spent) in the node, a mean execution time in the node, a combined payload (e.g., input request to the corresponding microservice) size into the node, a mean input payload size into the node, a mean output payload (e.g., output request for other microservices) size from the node, a previous action duration of the node, a depth of the node in the dependency graph, a mean execution time in a previous node (e.g., an upstream node), a standard deviation of execution time in a previous node, or a number of outgoing edges at the node. Input data 212 can be represented using appropriate data structures, such as vectors, tensors, Pandas Dataframes, and so on.

In some examples, input data 210a-k and input data 212 include data from a period of time (e.g., for the past 12 hours).

In some examples, a node is associated with a compensating transaction microservice, and input data 212 further include a number of nodes preceding the compensating transaction microservice node in the dependency graph, a number of nodes succeeding the compensating transaction microservice node in the dependency graph, a standard deviation of execution time of the compensating transaction microservice node, a mean execution time of the compensating transaction microservice node, or a combined payload size into the compensating transaction microservice node.

Input data 210a-k can be the inputs to convolutional neural networks (CNNs) 220a-k, respectively, whereas input data 212 can be the input to regression model 222. CNNs 220a-k and regression model 222 can compute likelihoods (e.g., log likelihoods) to fail for the nodes representing the microservices.

In this example, each of the CNNs 220a-k corresponds to a different distributed transaction, such as transactions 100a-b shown in FIG. 1. Accordingly, CNNs 220a-k can be different due to the difference in numbers of microservices of the different distributed transactions. Each of the CNNs 220a-k may compute only the likelihoods to fail for microservices in one distributed transaction. However, input data 210a-k can be aggregated such that one CNN is sufficient to handle the aggregated inputs. The aggregated inputs requires a larger CNN, which might be slower during training and evaluation than several smaller CNNs in parallel, such as CNNs 220a-k.

In this example, in addition, regression model 222 is shown as a unified model whose input data 212 is aggregated from data of different distributed transactions. However, regression model 222 can replaced by smaller models. For example, each smaller model can correspond to each distributed transaction and compute only the likelihoods to fail for microservices in the distributed transaction, similar to CNNs 220a-k, whereas input data 212 can be divided into data specific to each distributed transaction.

In some examples, other machine learning classifiers are used in place of the CNNs 220a-k, such as recurrent neural networks (RNNs), support vector machines, and/or the like. In some examples, regression model 222 includes a machine learning classifier, such as one or more of a logistic regression model, a support vector machine, a neural network, or a gradient-boosted tree classifier.

The likelihoods to fail computed by CNNs 220a-k and regression model 222 can be provided as input to aggregator 230. Aggregator 230 can identify a first set of nodes with output likelihoods of the CNNs 220a-k meeting a threshold likelihood and a second set of nodes with output likelihoods of the regression model 222 meeting the threshold likelihood. The threshold likelihood can be pre-determined (e.g., −0.1) or dynamically computed (e.g., as the $75^{th}$ percentile of likelihoods).

Aggregator 230 can further determine a combination of the first set of nodes and the second set of nodes, where the combination includes one or more common nodes in the intersection of the first set of nodes and the second set of nodes. The determined nodes in the combination are the risky nodes 240.

In an example, the first set of nodes are {a1, b2, c3, d4} and the second set of nodes are {a2, b2, c3, d4, k7}, and the intersection of the two sets includes b2 and c3. Accordingly, b2 and c3 are determined to be risky nodes 240.

Accordingly, risky nodes 240 (e.g., nodes in the intersection) represent microservices with high risks of failure and fixes can be preemptively applied to the microservices represented by the nodes in the intersection. In some examples, the fixes are applied by a coordinator, such as coordinator 130a-b shown in FIG. 1.

In some examples, aggregator 230 is implemented as a rule-based decision tree. In some examples, alternatively, aggregator 230 is implemented as a concatenation layer followed by one or more fully connected layers.

In certain embodiments, one or more machine learning models described herein, such as with respect to machine learning model 200, are trained using machine learning techniques to predict the likelihoods to fail for microservices. Training data may be generated based on historical input data 210a-k, historical input data 212 and/or other historical distributed transaction data, and the training data may include features associated with previous distributed transactions associated with labels (e.g., assigned by one or more users) indicating whether a microservice (e.g., represented by a corresponding node) failed or was going to fail in previous transactions. In an example, training is a supervised learning process that involves providing training inputs representing features associated with distributed transactions (e.g., as discussed with respect to input data 210*a-k* and input data 212) as inputs to the machine learning model. The machine learning model processes the training inputs and outputs predictions indicating a likelihood for a microservice indicated in the training inputs to fail. Predictions may, in some embodiments, be in the form of probabilities (e.g., likelihoods such as log likelihoods). The predictions are compared to the known labels associated with the training inputs to determine the accuracy of the machine learning model, and the machine learning model is iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used to calculate scores, and the like. In some embodiments, validation and testing are also performed for the machine learning model, such as based on validation data and test data, as known in the art. In some cases training, validation, and/or testing data is generated based on historical input data 210*a-k* and/or historical input data 212.

EXAMPLE INPUT DATA FOR FIXING MICROSERVICES IN DISTRIBUTED TRANSACTIONS

Figure 3:
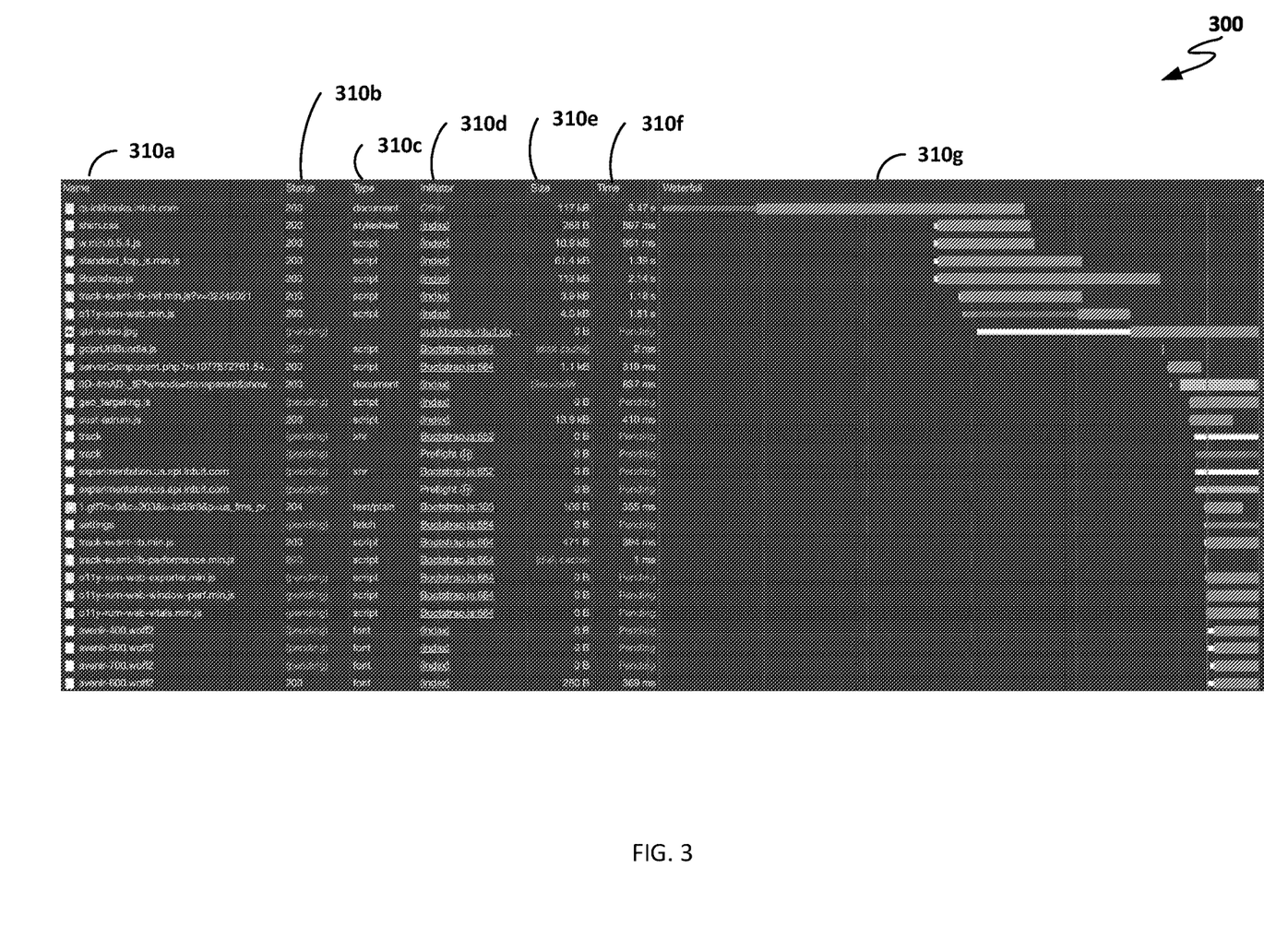
FIG. 3 depicts an example input data for fixing microservices in distributed transactions.

FIG. 3 depicts example input data 300 for fixing microservices in distributed transactions. Input data 300 can include inputs to a neural network, such as input data 210*a-k* as shown in FIG. 2. Although input data 300 is represented using a tabular format, input data 300 can be represented using other formats, such as a matrix, a tensor, a Pandas Dataframe, and so on. As depicted, input data 300 includes several nodes, and more or fewer nodes can be included in input data 300.

Input data 300 can include information about an identifier (e.g., through a network address) of a node (e.g., through the "Name" column 310*a*), a status of the node (e.g., through the "Status" column 310*b*), a type of the node (e.g., through the "Type" column 310*c*), an upstream node of the node (e.g., through the "Initiator" column 310*d*), a payload size (e.g., through the "Size" column 310*e*), an execution time of the node (e.g., through the "Time" column 310*f*), and a waterfall diagram of the node (e.g., through the "Waterfall" column 310*g*).

The "Waterfall" column 310*g* can include additional information about the node. For example, different segments of the waterfall diagram can indicate the time spent in different steps (e.g., stages) during the execution of a node. For example, a segment of the waterfall diagram can indicate the action duration of the node, another segment can indicate the execution time of the node, and yet another segment can indicate the waiting time of the node.

In some examples, the "Waterfall" column 310*g* is compiled for visualization, not necessarily as inputs to a machine learning model.

EXAMPLE OPERATIONS FOR FIXING MICROSERVICES IN DISTRIBUTED TRANSACTIONS

Figure 4:
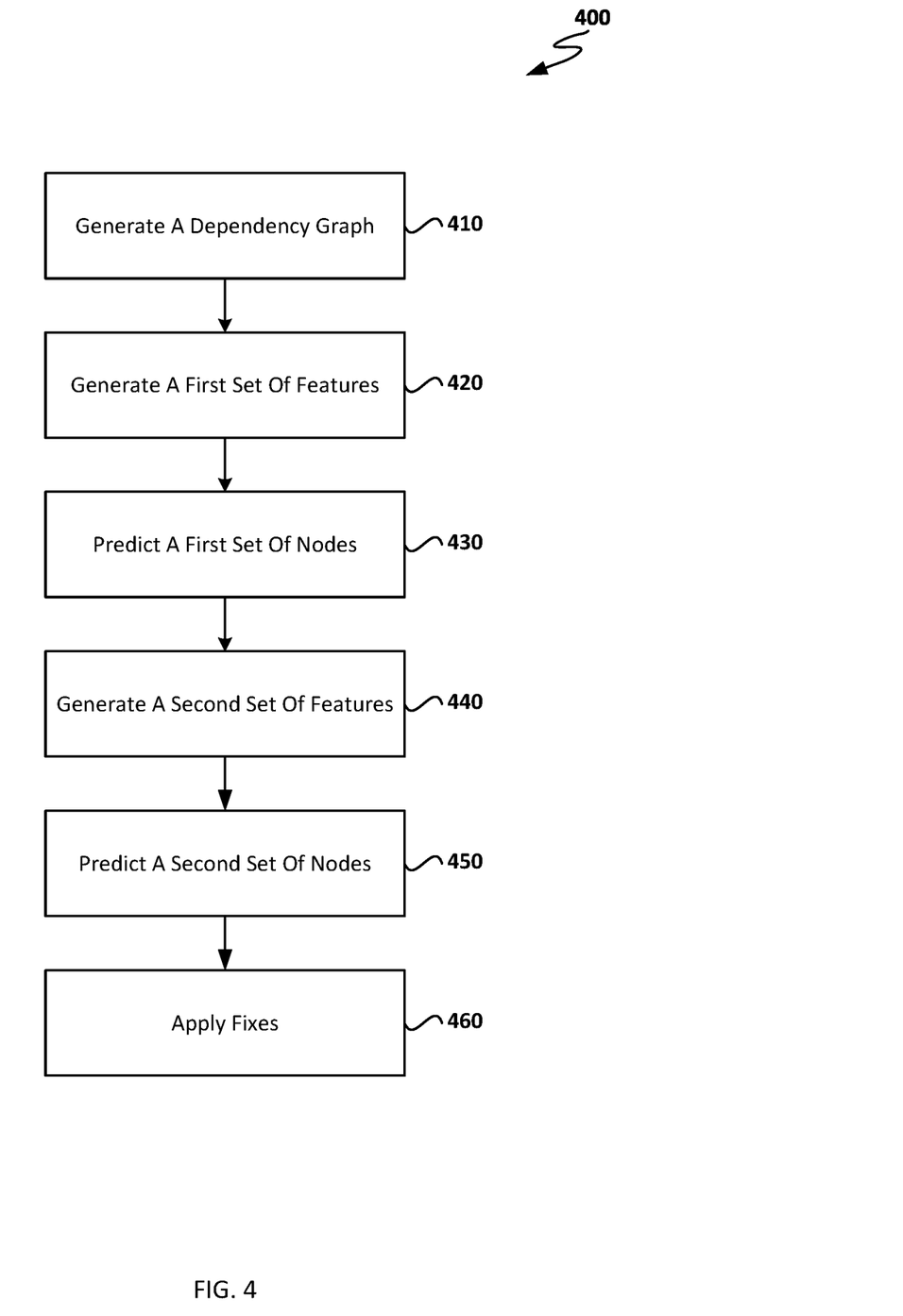
FIG. 4 is a flow diagram of example operations for fixing microservices in distributed transactions.

FIG. 4 is a flow diagram of example operations 400 for fixing microservices in distributed transactions. Operations 400 may be performed by a coordinator, such as coordinators 130*a-b* as illustrated in FIG. 1.

Operations 400 begin at 410, where a dependency graph is generated based on one or more microservices in a transaction, wherein each node of the dependency graph corresponds to each microservice of the one or more microservices in the transaction, respectively. For example, the dependency graph can be generated by a coordinator, such as coordinators 130*a-b* as illustrated in FIG. 1.

At 420, a first set of features is generated using the dependency graph. For example, the first set of features can be one of input data 210*a-k* as illustrated in FIG. 2.

In some embodiments, the first set of features comprises, for each node of the dependency graph, one or more of a size of payload (e.g., request size) for the node, an action duration (e.g., a delta between when the request is received and when the corresponding microservice starts to execute) of the node, a status (e.g., running, waiting, terminating, and so on) of the node, a type of a call (e.g., HTTP, HTTPS, FTP, and so on) to the node, or a network address (e.g., IP address) of the node.

At 430, a first set of nodes that are likely to fail are predicted using a first machine learning model based on the first set of features. For example, the first machine learning model can be one of CNNs 220*a-k* as illustrated in FIG. 2. In some embodiments, the first machine learning model comprises one or more of a CNN, an RNN, a support vector machine, and/or the like.

At 440, a second set of features is generated using the dependency graph. For example, the second set of features can be one of input data 212 as illustrated in FIG. 2.

In some embodiments, the second set of features comprises one or more of a number of nodes in the dependency graph, a mean execution time of all nodes in the dependency graph, a standard deviation of execution time of all nodes in the dependency graph, or, for each node of the dependency graph, a number of nodes preceding the node in the dependency graph, a number of nodes succeeding the node in the dependency graph, a standard deviation of execution time (e.g., time spent) in the node, a mean execution time in the node, a combined payload (e.g., input request to the corresponding microservice) size into the node, a mean input payload size into the node, a mean output payload (e.g., output request for other microservices) size from the node, a previous action duration of the node, a depth of the node in the dependency graph, a mean execution time in a previous node (e.g., an upstream node), a standard deviation of execution time in a previous node, or a number of outgoing edges at the node.

In some embodiments, a particular node in the dependency graph is associated with a compensating transaction microservice, and the second set of features further comprises one or more of a number of nodes preceding a given node representing the compensating transaction microservice in the dependency graph, a number of nodes succeeding the given node in the dependency graph, a standard deviation of execution time of the given node, a mean execution time of the given node, or a combined payload size into the given node.

At 450, a second set of nodes that are likely to fail are predicted using a second machine learning model based on the second set of features. For example, the second machine learning model can be regression model 222 as illustrated in FIG. 2. In some embodiments, the second machine learning model comprises one or more of a logistic regression model, a support vector machine, a neural network, or a gradient-boosted tree.

In some embodiments, the first set of nodes or the second set of nodes comprises nodes with a likelihood to fail meeting a threshold likelihood, as discussed with respect to FIG. 2.

At 460, one or more fixes are applied to one or more microservices based on a combination of the first set of nodes and the second set of nodes. For example, the one or more fixes can be applied by coordinators 130a-b as illustrated in FIG. 1.

In some embodiments, applying one or more fixes to one or more microservices based on the combination of the first set of nodes and the second set of nodes comprises identifying one or more common nodes in the intersection of the first set of nodes and the second set of nodes. For example, the one or more common nodes can be risky nodes 240 as illustrated in FIG. 2

EXAMPLE APPLICATION SERVER

Figure 5:
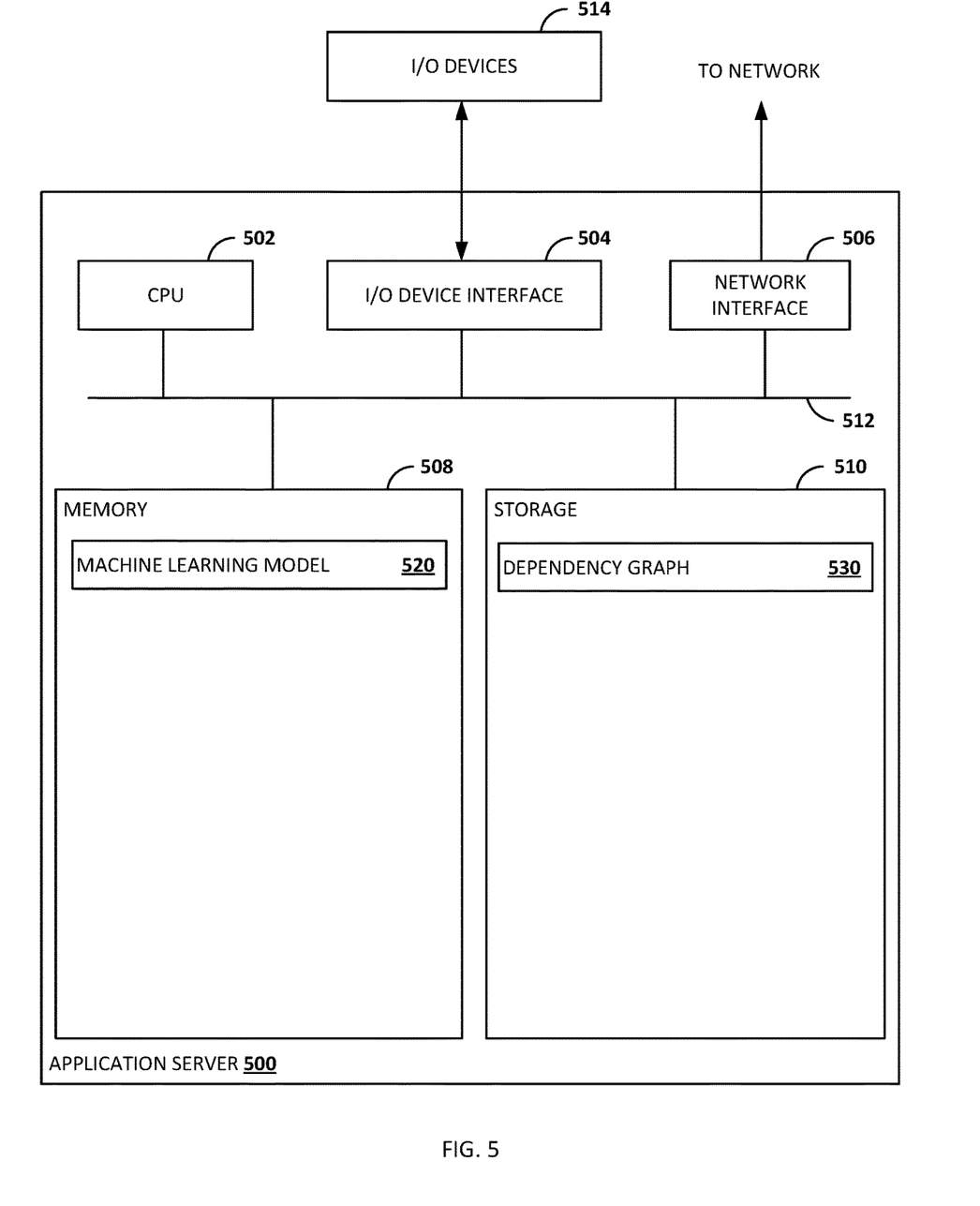
FIG. 5 depicts an example application server related to embodiments of the present disclosure.

FIG. 5 depicts an example application server 500, which can be used to deploy a coordinator, such as coordinators 130a-b as illustrated in FIG. 1. As shown, application server 500 includes a central processing unit (CPU) 502, one or more input/output (I/O) device interfaces 504, which may allow for the connection of various I/O devices 514 (e.g., keyboards, displays, mouse devices, pen input, etc.) to application server 500, a network interface 506, a memory 508, a storage 510, and an interconnect 512.

CPU 502 may retrieve and execute programming instructions stored in memory 508. Similarly, CPU 502 may retrieve and store application data residing in memory 508. Interconnect 512 transmits programming instructions and application data, among CPU 502, I/O device interface 504, network interface 506, memory 508, and storage 510. CPU 502 is included to be representative of a single CPU, multiple CPUs, a single CPU having multiple processing cores, and the like. I/O device interface 504 may provide an interface for capturing data from one or more input devices integrated into or connected to application server 500, such as keyboards, mice, touchscreens, and so on. Memory 508 may represent a random access memory (RAM), while storage 510 may be a solid state drive, for example. Although shown as a single unit, storage 510 may be a combination of fixed and/or removable storage devices, such as fixed drives, removable memory cards, network attached storage (NAS), or cloud-based storage. In some embodiments, storage 510 is an example of the database discussed with respect to FIG. 1.

As shown, memory 508 includes machine learning model 520. Machine learning model 520 may be the same as or substantially similar to machine learning model 200 of FIG. 2.

As shown, storage 510 includes dependency graph 530. Dependency graph 530 may be the same as or substantially similar to the dependency graph discussed with respect to FIG. 1.

It is noted that the components depicted in application server 500 are included as examples, and other types of computing components may be used to implement techniques described herein. For example, while memory 508 and storage 510 are depicted separately, components depicted within memory 508 and storage 510 may be stored in the same storage device or different storage devices associated with one or more computing devices.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:
1. A method, comprising:
generating a dependency graph based on one or more microservices in a transaction, wherein each node of the dependency graph corresponds to each microservice of the one or more microservices in the transaction, respectively;
generating a first set of features using the dependency graph;
predicting a first set of nodes that are likely to fail using a first machine learning model based on the first set of features;
generating a second set of features using the dependency graph;
predicting a second set of nodes that are likely to fail using a second machine learning model based on the second set of features; and
applying one or more fixes to one or more microservices based on a combination of the first set of nodes and the second set of nodes, wherein:
the first set of nodes or the second set of nodes comprises nodes with a likelihood to fail meeting a threshold likelihood; and
the applying of the one or more fixes to the one or more microservices based on the combination of the first set of nodes and the second set of nodes comprises identifying one or more common nodes in an intersection of the first set of nodes and the second set of nodes.

2. The method of claim 1, wherein the first set of features comprises one or more of:
for each node of the dependency graph:
a size of payload for the node;
an action duration of the node;
a status of the node;
a type of a call to the node; or
a network address of the node.

3. The method of claim 1, wherein the first machine learning model comprises a convolutional neural network.

4. The method of claim 1, wherein the second set of features comprises one or more of:
a number of nodes in the dependency graph;
a mean execution time of all nodes in the dependency graph;
a standard deviation of execution time of all nodes in the dependency graph; or
for each node of the dependency graph:
a number of nodes preceding the node in the dependency graph;
a number of nodes succeeding the node in the dependency graph;
a standard deviation of execution time in the node;
a mean execution time in the node;
a combined payload size into the node;
a mean input payload size into the node;
a mean output payload size from the node;
a previous action duration of the node;
a depth of the node in the dependency graph;
a mean execution time in a previous node;
a standard deviation of execution time in a previous node; or
a number of outgoing edges at the node.

5. The method of claim 4, wherein a particular node in the dependency graph is associated with a compensating transaction microservice, and the second set of features further comprises one or more of:
a number of nodes preceding a given node representing the compensating transaction microservice in the dependency graph;
a number of nodes succeeding the given node in the dependency graph;
a standard deviation of execution time of the given node;
a mean execution time of the given node; or
a combined payload size into the given node.

6. The method of claim 1, wherein the second machine learning model comprises one or more of a logistic regression model, a support vector machine, a neural network, or a gradient-boosted tree.

7. A system, comprising:
a memory including computer executable instructions; and
a processor configured to execute the computer executable instructions and cause the system to:
generate a dependency graph based on one or more microservices in a transaction, wherein each node of the dependency graph corresponds to each microservice of the one or more microservices in the transaction, respectively;
generate a first set of features using the dependency graph;
predict a first set of nodes that are likely to fail using a first machine learning model based on the first set of features;
generate a second set of features using the dependency graph;
predict a second set of nodes that are likely to fail using a second machine learning model based on the second set of features; and
apply one or more fixes to one or more microservices based on a combination of the first set of nodes and the second set of nodes, wherein:
the first set of nodes or the second set of nodes comprises nodes with a likelihood to fail meeting a threshold likelihood; and
the applying of the one or more fixes to the one or more microservices based on the combination of the first set of nodes and the second set of nodes comprises identifying one or more common nodes in an intersection of the first set of nodes and the second set of nodes.

8. The system of claim 7, wherein the first set of features comprises one or more of:
for each node of the dependency graph:
a size of payload for the node;
an action duration of the node;
a status of the node;
a type of a call to the node; or
a network address of the node.

9. The system of claim 7, wherein the first machine learning model comprises a convolutional neural network.

10. The system of claim 7, wherein the second set of features comprises one or more of:
a number of nodes in the dependency graph;
a mean execution time of all nodes in the dependency graph;
a standard deviation of execution time of all nodes in the dependency graph; or
for each node of the dependency graph:
a number of nodes preceding the node in the dependency graph;
a number of nodes succeeding the node in the dependency graph;
a standard deviation of execution time in the node;
a mean execution time in the node;
a combined payload size into the node;
a mean input payload size into the node;
a mean output payload size from the node;
a previous action duration of the node;
a depth of the node in the dependency graph;
a mean execution time in a previous node;
a standard deviation of execution time in a previous node; or
a number of outgoing edges at the node.

11. The system of claim 10, wherein a particular node in the dependency graph is associated with a compensating transaction microservice, and the second set of features further comprises one or more of:
a number of nodes preceding a given node representing the compensating transaction microservice in the dependency graph;
a number of nodes succeeding the given node in the dependency graph;
a standard deviation of execution time of the given node;
a mean execution time of the given node; or
a combined payload size into the given node.

12. The system of claim 7, wherein the second machine learning model comprises one or more of a logistic regression model, a support vector machine, a neural network, or a gradient-boosted tree.

13. A non-transitory computer readable medium comprising instructions to be executed in a computer system, wherein the instructions when executed in the computer system cause the computer system to:
- generate a dependency graph based on one or more microservices in a transaction, wherein each node of the dependency graph corresponds to each microservice of the one or more microservices in the transaction, respectively;
- generate a first set of features using the dependency graph;
- predict a first set of nodes that are likely to fail using a first machine learning model based on the first set of features;
- generate a second set of features using the dependency graph;
- predict a second set of nodes that are likely to fail using a second machine learning model based on the second set of features; and
- apply one or more fixes to one or more microservices based on a combination of the first set of nodes and the second set of nodes, wherein:
  - the first set of nodes or the second set of nodes comprises nodes with a likelihood to fail meeting a threshold likelihood; and
  - the applying of the one or more fixes to the one or more microservices based on the combination of the first set of nodes and the second set of nodes comprises identifying one or more common nodes in an intersection of the first set of nodes and the second set of nodes.

14. The non-transitory computer readable medium of claim 13, wherein the first set of features comprises one or more of:
- for each node of the dependency graph:
  - a size of payload for the node;
  - an action duration of the node;
  - a status of the node;
  - a type of a call to the node; or
  - a network address of the node.

15. The non-transitory computer readable medium of claim 13, wherein the second set of features comprises one or more of:
- a number of nodes in the dependency graph;
- a mean execution time of all nodes in the dependency graph;
- a standard deviation of execution time of all nodes in the dependency graph; or
- for each node of the dependency graph:
  - a number of nodes preceding the node in the dependency graph;
  - a number of nodes succeeding the node in the dependency graph;
  - a standard deviation of execution time in the node;
  - a mean execution time in the node;
  - a combined payload size into the node;
  - a mean input payload size into the node;
  - a mean output payload size from the node;
  - a previous action duration of the node;
  - a depth of the node in the dependency graph;
  - a mean execution time in a previous node;
  - a standard deviation of execution time in a previous node; or
  - a number of outgoing edges at the node.

* * * * *